United States Patent [19]

Marusak

[11] Patent Number: 5,733,632
[45] Date of Patent: Mar. 31, 1998

[54] WINDOW COVERING

[75] Inventor: Thomas J. Marusak, Loudonville, N.Y.

[73] Assignee: Comfortex Corporation, Watervliet, N.Y.

[21] Appl. No.: 585,345

[22] Filed: Jan. 11, 1996

[51] Int. Cl.$^6$ .................................. B32B 3/28; A47H 5/00
[52] U.S. Cl. .................. 428/181; 428/152; 428/176; 428/188; 160/84.1
[58] Field of Search .................................. 428/178, 116, 428/188, 181, 137, 152, 176, 913; 160/84.1, 89, 84.04

[56] References Cited

U.S. PATENT DOCUMENTS 4,884,612  12/1989  Schnebly et al. .................. 160/84.1
5,193,601  3/1993  Corey et al. ....................... 160/84.1

Primary Examiner—Donald Loney
Attorney, Agent, or Firm—Rader Fishman & Grauer PLLC

[57] ABSTRACT

A window covering comprises a series of spaced collapsible cells, each cell having a pair of opposed panels which are joined by permanently creased flexible material. One panel of each cell is secured to a first control cord and the opposite panel of each cell is secured to a second control cord. Relative longitudinal movement of the two control cords causes said opposed panels to move toward or away from each other to expand or collapse the cells. Each panel includes a stiffening portion which has a mechanical interlock formation which retains a bead on the associated control cord. In their collapsed condition, the cells are spaced from each other to allow light to pass from one side of the window covering to the other through the space between the cells. In the fully expanded condition of the cells, cooperating light obstructing formations on the exterior of the stiffening portions substantially abut and overlap to block direct passage of light between adjacent cells from one side of the window covering to the other.

5 Claims, 1 Drawing Sheet

U.S. Patent    Mar. 31, 1998    5,733,632
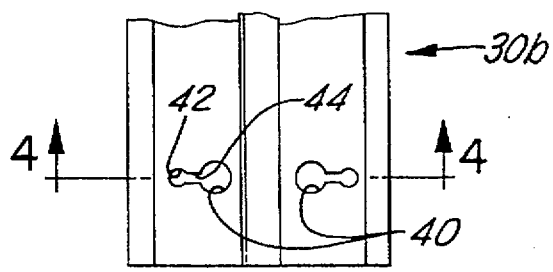
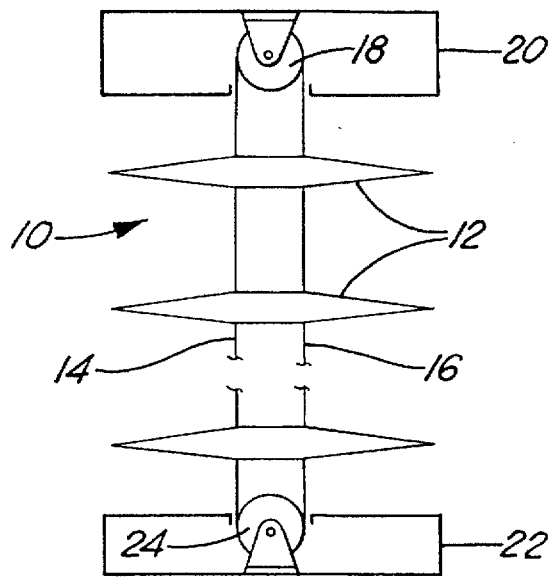
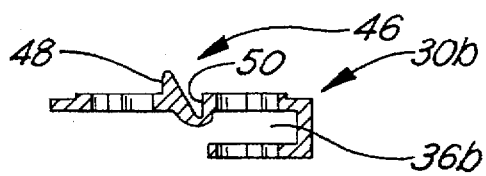
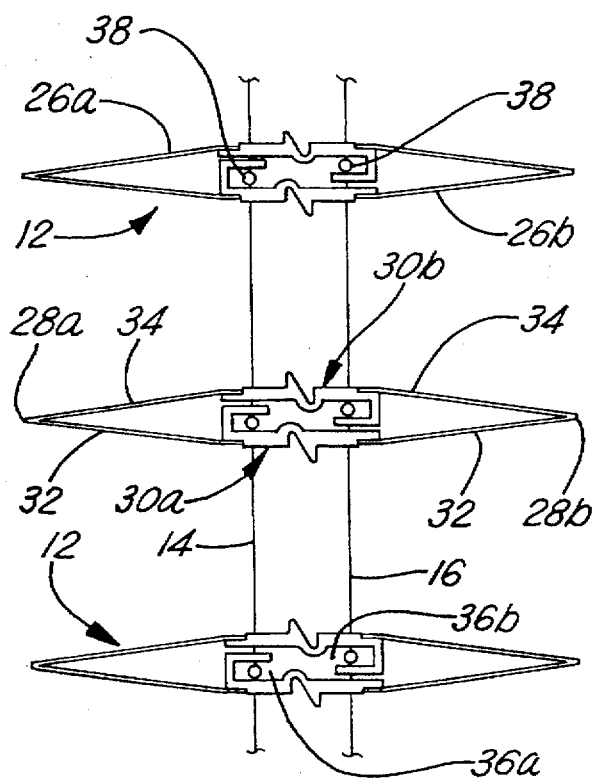
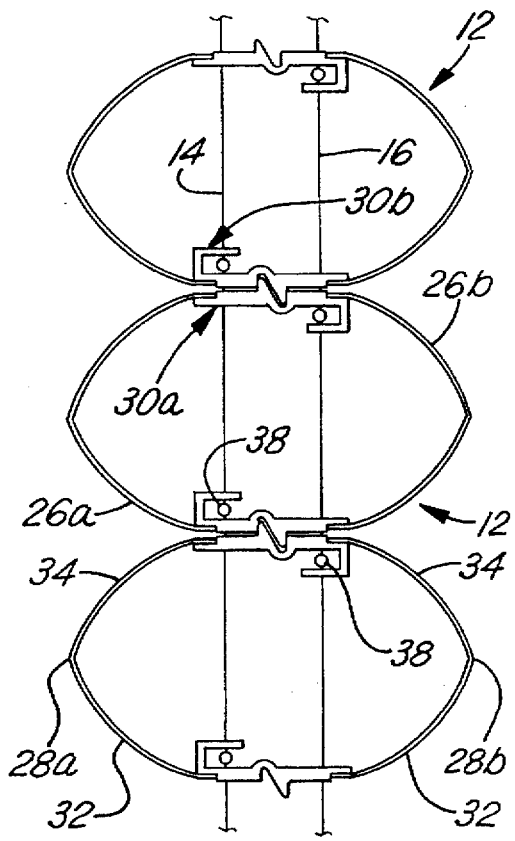

WINDOW COVERING

TECHNICAL FIELD

This invention relates to the field of window coverings, and more particularly to a window covering having a series of spaced collapsible cells.

BACKGROUND OF THE INVENTION

Window shades formed of expandable and collapsible cells in a variety of forms have been marketed and described in the patent literature. Rasmussen (U.S. Pat. No. Re. 30,254) and Colon (U.S. Pat. No. 4,603,072) disclose stacks of separate cells, subsequently joined together at a common wall. Terrell (U.S. Pat. No. 2,201,356) and Anderson (U.S. Pat. No. 4,673,600) describe stacks of cells formed from separate but continuous front and rear segments of fabric, joined together at abutting pleat crests or troughs. Cells formed from stacked and interdigitated, generally Z-shaped, partial cells are described in Anderson (U.S. Pat. No. 4,677,013). Corey and Schnebly (U.S. Pat. No. 5,193,601) disclose a double column of cells, formed from a single continuous web of pleated fabric folded upon itself in alternating opposite directions.

The first conception of a window covering formed of expandable and collapsible cells which are spaced from each other, rather than joined by either common or abutting walls, was made by Kendall Prince. In the Prince construction, the spaced cells each comprise opposed but hingedly joined walls which can flex toward and away from each other as the array of cells are collapsed and expanded. Because adjacent pairs of cells are spaced rather than directly connected or adjoining, it is possible to expand and collapse the fully deployed array of cells in place, without raising or lowering the entire array by means of lifting cords secured to the bottom cell or rail. Such construction provides greater flexibility in control of both the field of view and the amount of light transmitted through the window covering. The opening between adjacent cells can be varied from zero to a maximum gap determined by the thickness of the fully collapsed cell, or the cell array can be fully collapsed as the array is lifted to a stowed position at the top of the window opening.

Prince controls the expansion and collapse of his spaced cells by means of a pair of control cords which pass through and connect to each cell. One cord is connected to the upper wall and the other to the lower wall of each cell. Therefore, relative longitudinal movement of the two cords causes the opposed cell walls to move toward or away from each other, thereby collapsing or expanding the cells without necessarily changing their position. As disclosed to me, Prince's spaced cell construction secures the control cords to the cells by means of adhesive.

I am aware of another method of securing control cords to individual elements of a window covering. Schnebly and Marusak (U.S. Pat. No. 4,884,612) disclose a pleated blind with articulated slat extensions, wherein an offset control cord is connected to the slat extensions by means of "push-in" barbs located on rungs projecting from the cord and penetrating the slat extensions. Disadvantages of that fastening technique include the relatively complex design of the cord and rung molding, and the quantity of labor required to manually insert each barb into each slat extension.

It is the object of the present invention to provide a window covering of the spaced collapsible cell type, such as generally previously conceived by Kendall Prince, but in an improved form which can be more economically produced while providing enhanced structural integrity and aesthetic appeal.

SUMMARY OF INVENTION

A window covering comprises an array of spaced collapsible and expandable cells. The individual cells are formed of flexible non-woven or woven fabric or sheet material permanently creased to form hinge lines to aid in the orderly expansion and collapse of the cells. The cells also include a pair of stiffening members running longitudinally through at least a substantial portion of the cells, each joined to one of the opposed fabric walls of the cell. A first control cord is secured to a first corresponding stiffening member of each cell, and a second control cord is secured to the other corresponding stiffening member of each cell, so that relative longitudinal movement of the two control cords causes the cells to expand or collapse. In the preferred embodiment, the control cords have spaced beads which are retained within portions of the stiffening members. A series of oversize clearance holes and narrow slots permit the control cords and beads to be passed through the interior of the cells for assembly, and then slid laterally through the slots to the retaining portions.

BRIEF DESCRIPTION OF THE DRAWINGS

FIG. 1 is a simplified and fragmentary side or edge view of the window covering of the present invention, showing the individual cells in their fully collapsed condition.

FIG. 2A is an enlarged side view of the cells of FIG. 1, shown in their collapsed condition.

FIG. 2B is a view similar to FIG. 2A, but showing the cells in their fully expanded condition.

FIG. 3 is a fragmentary enlarged top view of one end of an upper stiffening member.

FIG. 4 is a sectional end view of the stiffening member of FIG. 3, viewed in the direction of arrows 4—4 of FIG. 3.

DETAILED DESCRIPTION OF THE PREFERRED EMBODIMENT

Referring to FIG. 1 of the drawings, the improved window covering 10 generally comprises a series of spaced, elongated, hollow, collapsible cells 12 secured to a pair of control cords 14, 16 which extend between an upper support rod 18 rotatably mounted in upper rail 20, and lower rail 22 in which lower pulley 24 is rotatably mounted. As is conventional, upper rail 20 may be secured to the ceiling in front of the window opening to be covered. It will be understood that, depending on the width of the window opening, at least two pairs of control cords would be desirable, one adjacent each longitudinal end of the cell array.

Not illustrated are conventional control cord actuation means which cause cords 14, 16 to move in opposite directions when upper support rod 18 is selectively rotated. Also not illustrated are conventional lifting cords, which extend between the upper and lower rail and which selectively act to pull the lower rail upward to collapse the entire cell array and stow it at the top of the window opening directly beneath the upper rail.

The construction of the individual cells 12 is better shown in FIG. 2A. Each cell comprises inner and outer segments of flexible material 26a, 26b, permanently creased at 28a, 28b, respectively, each bonded to both a lower and an upper stiffening member 30a, 30b, respectively. The flexible material may be non-woven or woven fabric or plastic sheet material such as thin film polyester. The permanent creases act as hinge points to aid in the orderly and uniform collapse of the cells. The stiffening members are preferably identical but inverted plastic extrusions. Alternatively, the flexible fabric or sheet material could, in one or more pieces, completely enclose the cell and be internally reinforced by more rigid stiffening members formed by extrusion or other fabricating techniques.

The stiffening members serve several functions. First, they provide a convenient and structurally sound means for connecting the cells to the control cords, as will be described below. Second, they maintain straightness and parallelism of the cells along their full length, thereby preventing gravity-induced sagging and enhancing the aesthetic appearance of the window covering. That stiffening function in turn reduces the number of sets of control cords required to assure uniform expansion and collapse of the cells along their length. Third, as will be explained, they lend themselves to incorporation of formations which establish a light-blocking cooperative interengagement between adjacent cells.

The upper portions of inner and outer flexible segments 26a,26b and upper stiffening member 30b together define an upper panel 34 which faces the upper end or top of the window covering. Similarly, the lower portions of segments 26a,26b and lower stiffening member 30a together define a lower panel 32 which faces the lower or bottom end of the window covering.

The stiffening members are provided with pockets 36a, 36b which serve to capture and interlock with beads or similar enlargements 38 secured at spaced intervals to the control cords. Thus, relative longitudinal movement of the control cords will cause the lower and upper lower panels 32,34 of each cell to move toward or away from each other to collapse or expand the cells, as desired. A comparison of the cell shapes in these two extreme conditions is illustrated by FIGS. 2A and 2B.

To assemble the control cords to the cell array, the individual cells are stacked in proper orientation, alignment and spacing, and each control cord is dropped down through aligned clearance holes 40 (see FIGS. 3 and 4). These holes have a larger diameter than that of beads 38, to permit such passage. The cords are longitudinally positioned so that the beads 38 are at the proper elevation to enter pockets 36a, 36b. Once that step is completed, the cords are pulled laterally (as viewed in FIG. 3) until the beads are positioned within the pockets, thereby establishing the required interlock. Cord passage holes 42 are smaller in diameter than beads 38, but larger that the diameter of the cords. Interconnecting slots 44 are smaller in width than the diameter of the control cords, so that the cord must be forcefully compressed or flattened during the assembly step to force the cord laterally from clearance holes 40 to passage holes 42. This interference fit serves to assure that the control cord, in use, will not unintentionally leave its operative position with the beads interlocked within the pockets of the stiffening members.

As best shown in FIGS. 2B and 4, the stiffening members are provided with overlapping formations 46, comprising a projecting portion 48 and a recessed portion 50. When the cells are fully expanded, the projecting portion 48 of one cell enters the recessed portion 50 of the adjacent cell, thereby establishing a complete barrier to direct passage of light between the cells, notwithstanding slight irregularities in the straightness of the cells along their length.

Those skilled in the art will appreciate that the present invention can also be used with the longitudinal axis of the cells oriented vertically, as a substitute for vertical blinds.

This invention may be further developed within the scope of the following claims. The foregoing description should be interpreted as illustrative of the preferred embodiment of this invention, rather than in a strictly limited sense.

I now claim:

1. In a window covering characterized by a plurality of elongated, parallel, hollow, collapsible cells arranged in a planar array, first and second cells of said array being located adjacent first and second ends, respectively, of said array, said cells having first and second generally opposed panels facing said first and second ends of said array, respectively, said panels including flexible material portions provided with permanent creases at the intersection between said first and second panels of each cell to permit said respective cell panels of each cell to pivot toward and away from each other to collapse and expand the cross-sectional shape of said cells, first and second generally parallel control cords extending between said first and second cells and intersecting all of said cells, said cords passing through the interior of said cells and being engageable with said panels for moving said opposed panels of each cell toward or away from each other upon relative longitudinal motion of said cords, actuation means operatively connected to at least one of said control cords for selectively causing relative longitudinal movement between said cords to thereby change the cross-sectional shape of said cells, adjacent pairs of cells being spaced from each other when in their collapsed condition, the improved means for providing engagement between said control cords and said panels comprising:

said first and second control cords each having enlarged portions located at spaced intervals there along;

said first and second panels having relatively non-flexible stiffening portions secured to said flexible material portions and positioned and configured to engage and interlock with said enlarged portions of said first and second control cords, respectively, to retain said enlarged portions within the associated cell, said stiffening portions extending longitudinally along the interior of said cells to assist in maintaining the straightness and parallelism of said cells;

whereby said cells may be caused to expand and collapse by operation of said actuation means and the resulting relative movement of said control cords and panels, to thereby vary the amount of light which may pass between adjacent pairs of cells.

2. The window covering of claim 1 wherein each cell comprises two generally V-shaped flexible material portions which define said permanently creased intersections between said opposed panels, one end of each V-shaped portion being secured to said stiffening portion of said first panel and the other end of each V-shaped portion being secured to said stiffening portion of said second panel.

3. The window covering of claim 2 wherein said stiffening portions each comprise a rigid plastic extrusion provided with holes through which said control cords pass, and further provided with a mechanical interlock formation configured to retain one of said enlarged portions of one of said control cords.

4. The window covering of claim 2 wherein said stiffening portions each include light obstructing formations on the exterior of the cell which substantially abut and overlap corresponding light obstructing formations of the stiffening portion of an adjacent cell when said cells are in their fully expanded condition, thereby to prevent direct passage of light from one side of said cell array to the other between adjacent cells.

5. The window covering of claim 3 wherein said extrusions for said first and second panels are identical.

* * * * *